Aug. 29, 1944.  L. G. KETCHAM  2,356,934
ART OF MOUNTING HOLLOW STRUCTURES
Filed Feb. 28, 1942
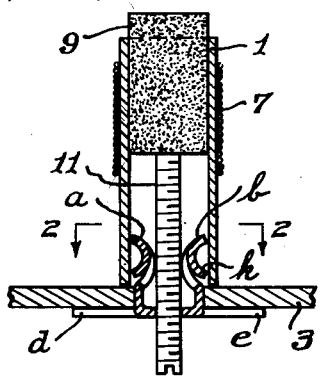
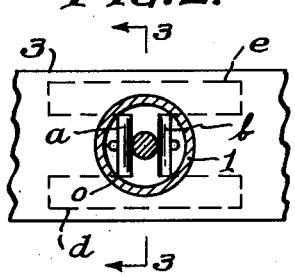
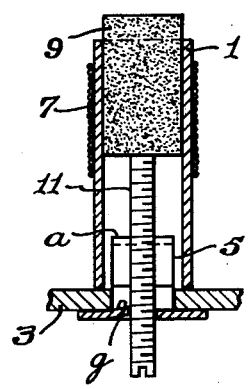
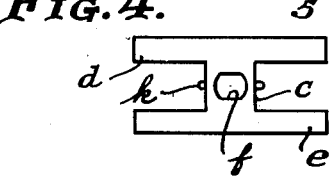
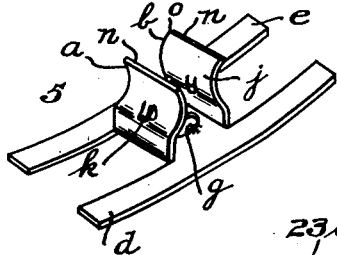
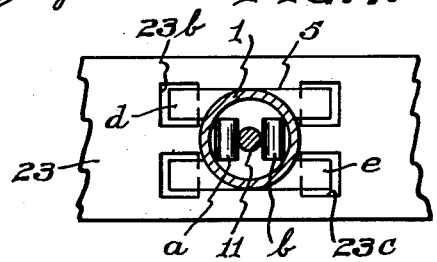
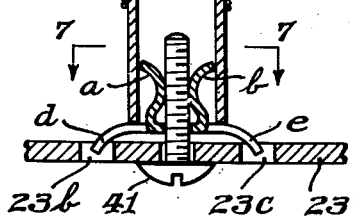
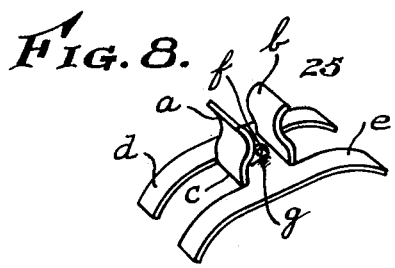
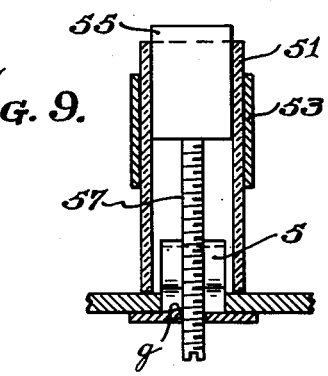
Inventor
Lyman G. Ketcham
By C.D. Tuska
Attorney Patented Aug. 29, 1944

2,356,934

UNITED STATES PATENT OFFICE 2,356,934

ART OF MOUNTING HOLLOW STRUCTURES

Lyman G. Ketcham, Oaklyn, N. J., assignor to Radio Corporation of America, a corporation of Delaware Application February 28, 1942, Serial No. 432,817

2 Claims. (Cl. 248—361)

This invention relates to the art of mounting coil forms, tubular capacitors and analogous hollow structures and has special reference to the provision of improvements in detachable fasteners for fixedly or adjustably securing such structures to a radio chassis, panel, bracket or similar support.

In the mounting of a hollow form upon a radio chassis, panel or the like, the prior art dictates the use of a clamp having upstanding arms which engage apertures, provided for the purpose, in the wall of the form. This practice is objectionable because the apertures, which must be large enough to permit ready entry of the clamps in spite of variations in the dimensions of the panel and of the clamps, may weaken the physical strength of the form. Further, the usually separate aperturing operation, plus rejects due to imperfectly formed apertures, add appreciably to the cost of the finished assemblies.

Accordingly, the principal object of the present invention is to obviate the foregoing and other less apparent objections to presently known methods of and means for mounting coil forms, tubular capacitors and analogous hollow structures.

Another and important object of the invention is to provide a novel and reliable means for mounting a coil, capacitor armature, or other electrical part, for movement with respect to another electrical part, whereby the mechanical and hence the electrical relation of said parts may be altered.

Other objects and advantages will be apparent and the invention itself will be best understood by reference to the following specification and to the accompanying drawing wherein:

Fig. 1 is a sectional elevational view of an installation comprising a supporting panel and a coil-form secured to the panel by means of the improved fastener of the present invention, Fig. 2 is a sectional view taken on the line 2—2 of Fig. 1, Fig. 3 is a sectional view taken on the line 3—3 of Fig. 2, Fig. 4 is an inverted plan view and Fig. 5 is a view in perspective of the fastener shown in Figs. 1 to 3, inclusive.

Fig. 6 is a view similar to Fig. 1 showing another embodiment of the invention,

Fig. 7 is a sectional view taken on the line 7—7 of Fig. 6,

Fig. 8 is a view in perspective of the fastener shown in Figs. 6 and 7 and

Fig. 9 is a sectional elevation showing the invention as applied to the mounting of a tubular capacitor.

In Figs. 1 to 5, inclusive, I designates a hollow tubular structure which, in the instant case, is constituted of insulating material such, for example, as cardboard or plastic impregnated fabric, and which is securely mounted on a supporting panel, bracket or other base 3 by means of the improved fastener 5 of the present invention. This hollow structure or form 1 has a coil 7 wound on its outer surface and a magnetic or other type core 9 mounted for longitudinal movement within its bore for the purpose of altering the effective inductance of the coil. A plunger or screw 11 which is embedded or otherwise attached to the core and which extends through an aperture in the panel 3 serves to adjust the position of the core 9 within the form 1 and with respect to the coil 7.

As shown more clearly in Figs. 4 and 5, the fastener 5 comprises a thin spring metal strip which may be cut in the shape of the letter H and having a pair of upstanding resilient arms $a$ and $b$, of special construction, later described, on its cross-piece or yoke $c$. The legs $d$ and $e$ of this H-shaped piece may be bowed outwardly with respect to the plane or the under surface of the panel 3 (Fig. 1) so that they will bear against the said surface in spite of minor variations in the thickness of said panel. The cross-piece or yoke $c$ has an aperture $f$ therein of a diameter sufficient to receive and to guide the core adjusting plunger or screw 11 of Figs. 1 and 3. Where, as in the instant case, the core adjusting member 11 comprises a screw, the aperture $f$ in the yoke $c$ is preferably elliptical, the shorter diameter of the ellipse corresponding substantially to the pitch diameter of the thread. A point along the edge defining the elliptical aperture $f$ is preferably bent out of its normal plane, as indicated at $g$, (Fig. 3), to provide a pitched edge for engagement with the thread of the screw 11. The upstanding arms $a$ and $b$, respectively, are adapted to be entered within the bore of the coil form 1 through the aperture in the panel 3 and are bowed inwardly, as indicated at $j$ (see Fig. 5) to provide a pair of opposed guiding surfaces for the core adjusting member 11. If desired, a tongue $k$ may be struck out from each arm beneath its inwardly bowed surface to provide a pair of retaining elements which prevent the fastener from dropping out of the panel 3 prior to the entry of the adjusting member 11 between the opopsed surfaces of the said arms. These resilient upstanding arms $a$ and $b$ are each provided with an outwardly turned edge $n$ having preferably sharp corners $o$. Thus, when the core adjustment member 11 is entered between the said arms, they are biased outwardly and the said corners ($o$) are urged into engagement with the inner surface of the coil form 1, whereby the said structure is securely fastened to the panel 3.

Should it become necessary or desirable to change coils, the assembly may be quickly dismantled by unscrewing the core to a point whereat the free end of the adjusting screw 11 is withdrawn from its position between the upstanding arms $a$ and $b$ of the fastener, whereupon the coil form 1 may be lifted off and replaced by a new coil and form.

While in the embodiment of the invention shown in Figs. 1 to 5 inclusive, the fastener 5 serves to rigidly attach the coil form 1 to the panel 3, the said fastener can be modified and arranged to permit of a limited range of movement of the structure to which it is attached. Such a modification is illustrated in Fig. 6, wherein two coils 21, 37 are shown on separate forms 21 and 31, respectively. Here the form 21 is mounted to permit of its being moved along its vertical axis with respect to the other coil form 31, toward and away from the plane of the supporting panel which is here designated 23. To permit of such vertical adjustment of the coil form 21, the legs $d$ and $e$ of the fastener 25 (see Fig. 8) are bowed or bent in a direction opposite to the direction of extension of its upstanding arms $a$ and $b$ and the fastener itself is placed adjacent the same (upper) side of the panel as the coil form.

As in the previously described embodiment of the invention, the edge of the elliptical aperture $f$ in the cross arm or yoke $c$ of the fastener receives and guides the thread for the adjusting screw, here designated 41. Thus, when the screw 41 is turned, say to the right, the base or yoke $c$ is urged downwardly against the force of the bias provided by its bowed convex construction toward the surface of the panel 23. This downward force is transmitted through the fastener arms $a$ and $b$ to the form 21 which is thereby moved in the same downward direction. Obviously, movement of the coil 21 away from the panel and toward the coil 37 on form 31 is effected by turning the screw 41 in the opposite direction. In order to prevent rotation of the form 21 and fastener 25 with respect to the panel, as the screw 41 is rotated, the fastener legs $d$ and $e$ may be keyed to the panel as by seating the extremities of the said legs in recesses or apertures 23b, 23c which are provided for the purpose on opposite sides of the panel-aperture through which the adjusting screw 41 passes.

As previously indicated, the fastener of the present invention is not limited in its useful application to the mounting of coil forms but is susceptible of use with various other hollow structures. Thus, in Fig. 9 a fastener 5, similar to the one shown in Figs. 1 to 5 inclusive, is employed in the mounting of a capacitor which comprises a hollow tube 51, which may be constituted in whole or in part of polystyrol or other suitable dielectric, having a sheet-like metal armature 53 fixed on its outer surface and an inner core-like armature 55 mounted for movement within its bore by means of an adjusting screw 57.

Various other applications and modifications of the invention will suggest themselves to those skilled in the art. Accordingly, the foregoing description of certain embodiments of the invention should be interpreted as illustrative and not in a limiting sense except as required by the prior art and by the spirit of the appended claims.

What is claimed is:

1. In combination, an electrical device of the type comprising a tubular form incorporating an adjusting member which extends beyond an open end of said form for varying the electrical characteristics of said device, a supporting panel having an aperture therein through which said adjusting member extends, and a fastener for securing said device to said panel, said fastener comprising a spring metal strip having a pair of arms struck out in opposite directions from a central portion thereof, said arms being bent in a common direction substantially normal to the plane of said central portion and adapted to be entered within said hollow structure through said aperture, the remaining portion of said strip comprising a stop for limiting the extent of the entry of said arms within said hollow structure, said arms being bowed inwardly intermediate their ends and their free ends extending oppositely in outward directions, and said central portion of said strip being apertured to receive said adjusting member, said adjusting member being of a diameter sufficient to urge said arms into engagement with the inner surface of said hollow structure when it is entered between the opposed surfaces of the inwardly bowed portions of said arms.

2. A fastener for securing a hollow structure to an apertured supporting panel, said fastener comprising an H-shape base constituted of spring metal having an aperture on the cross arm of the H and a pair of upstanding arms integral with said cross arm, said upstanding arms having outwardly turned ends adapted to be entered within said hollow structure the parallel arms of the H comprising a stop for limiting the extent of the entry of said upstanding arms within said hollow structure, and means adapted to extend through said cross arm and panel and between said upstanding arms for biasing the outwardly turned ends of said arms into engagement with the inner surface of said hollow structure.

LYMAN G. KETCHAM.